3,380,065
RECORDER USING EITHER A STATIONARY OR MOVING CHART
Nelson Leigh Alpert, Fairfield, Edward Sherwood Gillette, Easton, John Michael Roche, West Redding, and Abraham Savitzky, Norwalk, Conn., assignors to The Perkin-Elmer Corporation, Norwalk, Conn., a corporation of New York
Filed Mar. 30, 1966, Ser. No. 538,822
2 Claims. (Cl. 346—29)

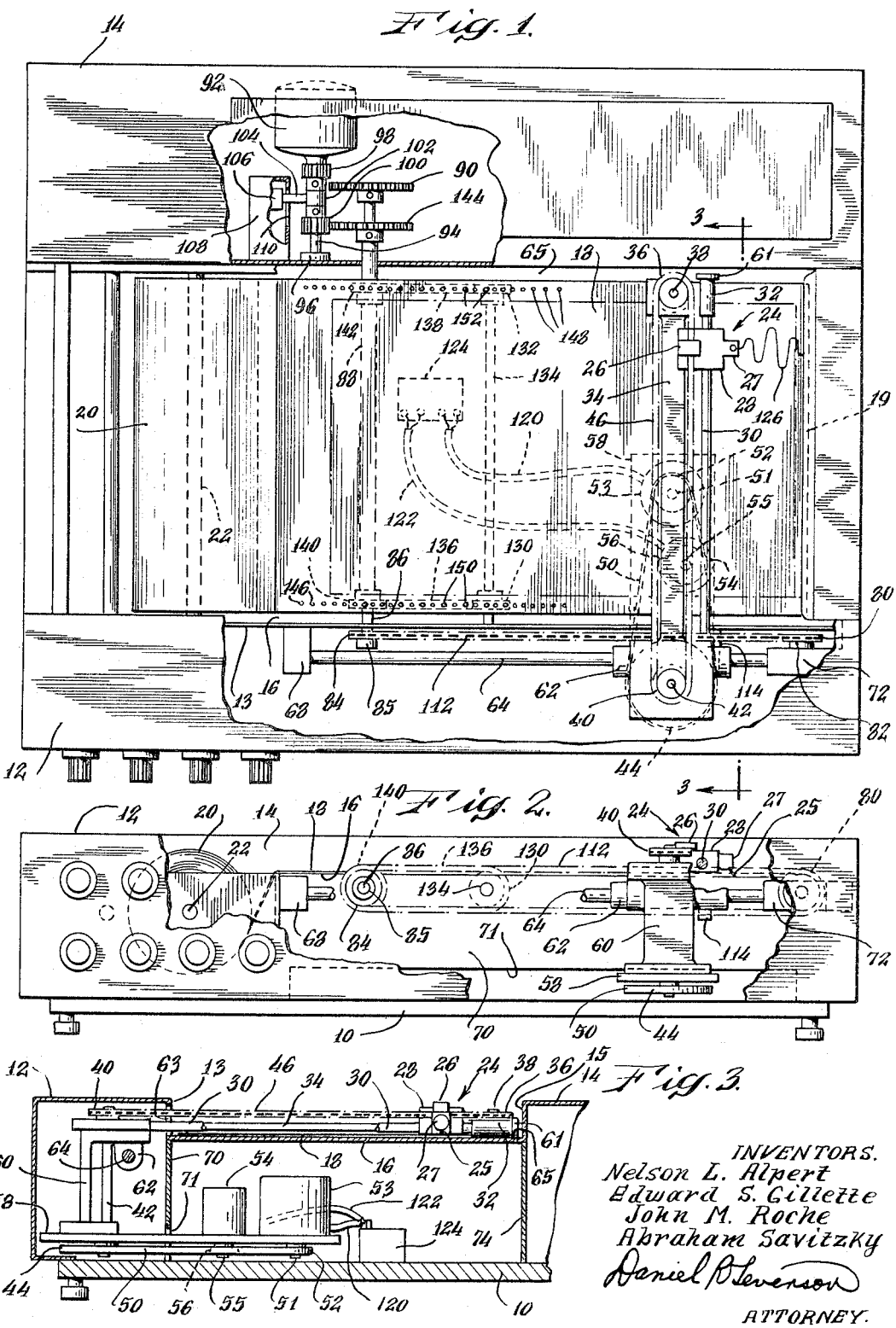

ABSTRACT OF THE DISCLOSURE

This chart recorder may use either a stationary cut chart or a moving continuous strip chart. When a cut chart is used, the pen carriage, on which the pen is mounted for transverse movement, is moved longitudinally above the stationary chart. For continuous strip chart use the pen carriage is stationary and the long uncut strip is continuously moved.

---

This invention relates to the field of chart recorders. Such chart recorders are designed to produce upon a recording sheet (usually of paper) a representation of a set of measured data versus another variable (the latter often being time).

Existing chart recorders may be classified into two categories: those that use a stationary recording chart or sheet, and those that utilize a continuously moving recording strip chart. In the fixed chart type, the pen must be moved not only in the direction representing the measured variable (hereinafter referred to as the "ordinate information" direction, corresponding to the "transverse" direction of the chart), but an additional mechanism must be provided for moving the pen in another direction (usually at right angles to the first direction, and therefore referred to hereinafter as the "abscissa information" direction or the "longitudinal" direction of the chart). In the second or continuous strip type of chart recorders the chart is moved in its longitudinal direction so as to provide the abscissa base, and the pen need only move transversely, in response to the signal which is to be recorded as the ordinate of the recorded curve.

The first, fixed chart type of recorder has the advantage when used to make repeated recordings of similar data that a series of such recorded charts may be readily compared. Further, certain reference lines and other data may be printed on the chart prior to use, thus assuring uniformity of data placement in each recording. In addition the cut chart itself is much more convenient in ease of mounting on the recorder, handling, storage and the like. On the other hand a continuous strip recorder has the advantage that a recording of essentially limitless length (in the abscissa direction) may be made. Also, the errors caused by stretching (or shrinkage) of the paper in the abscissa direction can be substantially eliminated, since the pen may be always closely adjacent the drive sprocket of the continuous chart (the drive sprocket holes in the paper thereby providing a fixed reference). Thus each type of recorder has certain advantages and disadvantages relative to the other; therefore even when recording the same type of data one or the other type of recorder may be preferable, depending on the objects of a particular recording.

The primary object of the present invention is the provision of a chart recorder which may be utilized either with stationary cut charts or, alternatively, with a moving chart of the continuous strip type, thereby affording the operator a choice of either mode of operation.

Other objects of the invention include the provision of such a dual-purpose chart recorder which is relatively inexpensive to manufacture, easy to use, and both precise and relatively maintenance-free in operation.

Additional objects and advantages of the invention will become apparent to one skilled in the art upon reading the following detailed description in conjunction with the accompanying drawings, in which:

FIG. 1 is a plan view of the chart recorder with parts of the casing cut away to better illustrate the various mechanical parts;

FIG. 2 is a side elevational view, also with parts of the casing broken away to show some of the internal mechanical parts; and FIG. 3 is an end sectional view, taken on the line 3—3 in FIG. 1.

The illustrated exemplary embodiment of the invention comprises a main supporting base plate 10 to which are attached two longitudinally extending side casings or housings 12 and 14 respectively (see FIG. 1). A horizontal platform or plate 16 (see also FIG. 3) extends between, but somewhat below the top of, the two side casings 12 and 14. This horizontal platform 16, which constitutes the chart receiving surface of the instrument, is supported at its sides by the upper parts 13 and 15 (see FIG. 3) of longitudinal walls 70, 74 (later to be described). In FIGS. 1–3 a continuous strip chart 18 is shown as the medium upon which the recording is to be made. Such continuous charts are available in various configurations, such as a continuous roll or as a long strip which has been folded in a zigzag pattern (so called "fan fold") so as to form a thick stack. For exemplary purposes it is assumed that the continuous strip chart is in a rolled form, at 20, and is supported for example by means of a removable rod 22. As will appear subsequently, the recorder of the invention is also adapted to use alternatively a cut chart or recording sheet, which would occupy the position indicated in dotted lines at 19.

The element which actually causes the data to be recorded on one or the other of the charts (18 or 19) in visible form comprises a pen, generally shown at 24, having a depending point or nib 25 which, in use, physically contacts the upper surface of the recording sheet (see particularly FIGS. 2 and 3). A pen 27 is pivotally supported by conventional means in a pen block or bracket 28. Accordingly the pen 27 may be pivoted so as to lift the point 25 from the recording chart when replacing or adjusting the latter between recordings. The pen may be held, for example, by gravity in its normally operative position while being rotatable to another stable position such that the pen is completely removed from the recording chart. A handle and/or a releasable holding means (not shown) may be additionally supplied to facilitate, respectively, lifting and holding of the pen in its inoperative position.

The pen bracket 28 is slidably supported by a long pen assembly shaft 30. This shaft is rigidly supported in end brackets 32, at the opposite ends of a supporting bar or elongated plate 34. At one end of this elongated bar (namely, the right-hand end as seen in FIG. 3) an idler pulley 36 is mounted by means of a stub shaft 38. At the opposite (left-hand in FIG. 3) end of the bar, a drive pulley 40 is rigidly attached to one end of a drive shaft 42, the other end of which has rigidly attached thereto a large driven pulley 44. An indexable beaded (i.e., non-slip) belt 46 extends over the pen mechanism pulleys 36 and 40, and is attached at one point to the pen bracket 28 by means of a clamping plate 26, releasably attached to the pen bracket by any conventional means (not shown). Because of this attachment, rotation of the drive pulley 40 and therefore of the belt 46 will cause the pen bracket 28 and the supported pen 27 to move laterally along the pen shaft 30. The large driven pulley 44 at the lower end of shaft 42 is driven by an indexable belt 50, driven in turn by motor drive pulley 52, rigidly attached to the end of motor shaft 51 of motor 53. Motor 53 is supported on a mechanism plate 58, which also rotatably supports the motor shaft 51 and the lower end of the pulley shaft 42.

The following or feedback potentiometer 54 is driven conjointly with the driven pulley 44 by, for example, a pulley 56 on potentiometer shaft 55, engaging belt 50. In this manner the potentiometer is always rotatively positioned in accordance with the (linear) position of the pen, so that the variable output tap of the potentiometer supplies an electrical signal which is a function of the pen position. This pen position signal is used as the feedback voltage in the servo circuit of the motor 53, in a weel-known manner. This essentially conventional servocontrol therefore causes the pen (i.e., bracket 28) to be traversed along shaft 30 until it reaches the position represented by the (amplitude of the) data to be recorded. Although the illustrated pen-traversing mechanism utilizes solely pulleys and belts, obviously other conventional drive connections (such as gears, engaging friction disks, and the like) may be utilized instead.

A relatively large pen assembly bracket 60 is rigidly attached, at its upper end, to the left-hand end of the pen bar 34 (see FIG. 3) and, at its bottom, to the mechanism plate 58. The upper part of bracket 60 has a long bearing or bushing portion 62, which slidably engages a longitudinal shaft 64, rigidly attached to the stationary part of the instrument. Because of the various rigid connections so far described, all of the elements numbered between 24 and 62 are capable of sliding as a unit along stationary bar 64 in the longitudinal direction (i.e., left and right in FIGS. 1 and 2). Vertical wall 13 has an extensive horizontal slot 63 (see FIGURE 3) to allow this movement of these elements (and especially rod 30 and bar 34). To stabilize these elements 24–62 (hereinafter referred to as the pen carriage or entire pen assembly), a small wheel 61 is rotatably attached to the end of the assembly (e.g., shaft support 32) remote from the supporting shaft 64. This small wheel 61 rides on a track portion 65 of the main platform 16 not normally covered by the paper chart (as may best be seen in FIGS. 1 and 3). The stationary longitudinal shaft 64 is rigidly supported at its left-hand end by a block 68 secured to a stationary vertical wall 70 (see FIGS. 1 and 2) forming a lower continuation of the upper wall part 13 of the recorder housing. The right-hand end (in FIGS. 1 and 2) of the pen carriage bearing shaft 64 may be rigidly supported in a socket of a similar block 72, also supported by wall 70. This wall 70 has an extensive horizontal slot at 71 to allow longitudinal movement of the lower parts of the pen carriage assembly (i.e., mechanism plate 58, etc.) (see FIGS. 2 and 3).

At this point it should be noted that activation of the pen motor 56 will cause movement of motor pulley 52, belt 50, large pulley 44 and therefore shaft 42 and upper pen drive pulley 40; this in turn will cause movement of the upper belt 46 (and idler pulley 36). Because of the clamping action of plate 26, movement of belt 46 will drive the pen bracket 28 and the attached pen mechanism (pen block 28 and pen 27) along the lateral pen support shaft 30. This part of the mechanism comprises the transverse or ordinate pen drive. In addition the entire pen carriage assembly (comprising elements numbered between 24 and 62) is supported for longitudinal movement along the stationary longitudinal shaft 64. One exemplary manner in which the entire pen carriage assembly may be caused to move along this shaft 64 will now be described.

An idler pulley 80 is mounted on a horizontal stub shaft 82 on bracket 72 mounted on fixed vertical wall 70 (as viewed in FIGS. 1 and 2). An aligned and similar pulley 84 is rigidly mounted (as by end cap 85) on an inner shaft 86 rotatably supported in a bearing surface in this same vertical housing wall 70 near the middle of the instrument, as viewed in FIGS. 1 and 2. Inner shaft 86 extends through (and is independently rotatable relative to) a hollow coaxial shaft 88 (which will be subsequently described) and has a gear 90 rigidly attached at its other end (near the top of FIG. 1). A prime mover in the form, for example, of motor 92 may be connected directly (as shown) or by conventional reduction gearing (which is preferably made variable in a well-known manner) to a drive shaft 94 rotatably supported at one end in bearing 96.

A pair of pinions 98 and 100 are supported by drive shaft 94 (which may be provided with a slot or keyway). Gears 98 and 100 are attached to drive shaft 94 in such manner that they may slide longitudinally along the shaft (i.e., in the direction extending upwardly and downwardly in the plane of the paper of FIG. 1) but can rotate only along with the shaft 94. This may be accomplished by means of pins in the longitudinal slot in shaft 94, by similar keys in keyways or other types of splining, as is well known. Preferably the gears 98 and 100 are so connected to a single bridging piece 102 (which is loose on shaft 94) that they may rotate independently of this piece, but will slide longitudinally therewith. Bridging piece 102 is provided with an arm or extension 104, which in turn is connected to an actuator 106. Actuator 106 is mounted for sliding movement (in the up-and-down direction in FIG. 1, which is transversely in the instrument itself), and may be moved by any conventional means. For example, element 106 may be attached to the end of a shaft extending transversely across the instrument to a push-pull knob. Alternatively element 106 may form (or be attached to) the armature of a solenoid so as to be driven either upwardly or downwardly in a well-known manner, as an electromagnet is energized, for example, by means of a conventional switch. Actuator 106 is indicated as being contained in a small housing or shell 108, which is provided with clearance as at 110 so as to allow movement of arm 104.

Movement of actuator 106, and therefore arm 104, actuating collar 102 and driving pinions 98 and 100, in the downward direction in FIG. 1 will obviously cause engagement of pinion 98 with gear 90. Such engagement will therefore cause the driving of inner shaft 86 and therefore the drive pulley 84. A nonslip belt 112 extends between drive pulley 84 and idler pulley 80. The lower loop of this belt is fixedly attached as by a small clamping plate 114 to the lower part of the pen carriage assembly. Because of the construction just described, motor 92, when energized, will drive elements 98, 90, 86, 84, 112, and therefore the entire pen carriage assembly whenever pinion 98 is engaged with gear 90 by means of the actuator 106. Pinion 98 will be engaged with gear 90 whenever a cut chart is utilized (at 19) (or whenever else it is desired to drive the entire pen carriage) from right to left (or vice-versa) in FIG. 1 for any reason.

Normal operation of the device with a cut chart is as follows. The pen motor 53 and the follower potentiometer 54 output will be connected as by flexible cables 120 and 122 to a stationary terminal board 124, which in turn will be connected directly or indirectly to the electrical output of the data supplying instrument with which the recorder is being used and the rest of the servomotor circuit. The pen motor 53 will therefore drive the immediate pen assembly (elements 27, 25 and 28, 26) transversely along rod 30 to an ordinate position proportional to the amplitude of the signal being recorded. At the same time motor 92 will drive (usually in a single direction at a constant rate) the entire pen carriage assembly (elements 24–62) in the longitudinal (i.e., right to left in FIGS. 1 and 2) or abscissa direction of the chart. This will cause the pin to draw a visible trace on the fixed cut chart 19, such as indicated at 126 in FIG. 1. It is of course assumed that drive pinion 98 is in engagement with gear 90 so as to cause this movement of the entire pen carriage previously pointed out.

As previously stated, the typical mode of operation with such a cut chart is to drive the entire pen carriage at a steady rate from left to right in FIG. 1 so as to provide the abscissa coordinate of the recording (which coordinate is often time). It is of course possible to programe the energizing source of the motor 92 so as to cause a nonuniform movement of the entire pen carriage. In fact it is even possible to energize motor 92 by means of servo techniques or programs so that the abscissa ($x$ axis) coordinate function may be independently controlled. Because of the relatively large mass of the entire pen carriage assembly, if such independent $x$ and $y$ coordinate data input techniques are employed, it is highly preferable to limit the $x$ coordinate data to relatively slowly changing values. The relatively light immediate pen assembly (elements 24–28) allows the recording of relatively rapid changes in the ordinate or $y$ coordinate data (for example, full scale movement in no more than one second). Even where it is not anticipated that the entire pen carriage will be moved except at a constant rate (i.e., for a constant, linear abscissa scale), nevertheless, it is desirable to be able to rotate gear 90 at different constant speeds so as to provide different speed recordings (which yield different resolution in the recording precision). For this purpose of variable gear transmission may be positioned between motor 92 and pinion 98 as previously mentioned, or motor 92 may be variable speed motor having an appropriate variable power supply means. The entire pen carriage assembly will normally be returned to its starting position (i.e., to the right in FIGS. 1 and 2) between recording by, for example, reversing of the motor 92 or the intermediate gear transmission just mentioned.

The remaining structure is for driving a continuous strip chart when that type of recording medium is employed. This continuous strip chart driving mechanism may comprise a pair of idler pulleys 130, 132 rightly attached on opposite ends of a shaft 134 near the middle of FIG. 1. Pulleys 130 and 132 are connected, respectively by belts 136 and 138 of the non-slip type to a pair of driving pulleys 140 and 142 rigidly mounted on previously mentioned hollow shaft or sleeve 88. This hollow shaft 88 although coaxial with inner shaft 86 is free to rotate independently thereof, in supporting bearings in walls 70 and 74, and has rigidly attached at the upper end thereof a gear 144. As may be seen in FIG. 1, gear 144 may optionally mesh with the other drive pinion 100 splined to drive shaft 94. Therefore when actuator 106 is in one position (as shown), drive pinion 98 will be released from gear 90 and drive pinion 100 will drive gear 144. This will cause rotation of hollow shaft 88, both of the continuous strip drive pulleys 140 and 142, both belts 136 and 138, and therefore both idler continuous strip pulleys 130 and 132. Each of belts 136 and 138 carry on their outer surface a series of projections or sprocket teeth spaced apart the same distance (or an integral multiple thereof) as the perforations near the edges of the continuous strip chart 18. These perforations in the strip chart are indicated at 146 and 148, while exemplary projections or teeth in the continuous strip drive belts are indicated at 150 and 152, respectively.

The operation of the device when a continuous strip chart is utilized is as follows. First, the pin carriage assembly will be returned to the left and locked in position, so that the pen contacts a continuous strip in an area between the two continuous strip pulley shafts 88 and 134. Although such position of the pen carriage is not absolutely essential, it is preferable so as to minimize any effects of stretching that might occur in the continuous chart between the pen and the driving positions. Since paper drive belts 136, 138 engage the continuous strip chart in its perforations along a series of points between the two pairs of pulleys (132 and 142, and 130 and 140), the adverse effects of possible paper stretch are substantially eliminated in this manner. With the pen carriage more or less overlying the power shaft 88 (and the pen point 25 therefore being slightly to the right thereof), the actuator 106 should be moved to the shown position so as to engage drive pinion 100 with gear 144. Motor 92 (when energized) will therefore drive the continuous strip to the right as viewed in FIGS. 1 and 2, typically at a constant rate so as to supply a linear abscissa base. The pen motor 53 and its driven elements will operate in the same manner as previously described for the cut chart mode; therefore this description is not repeated. In fact if the continuous strip chart is moved to the right at a particular linear rate and a particular set of data is supplied to the pen motor terminals, the resulting graphical representation (analogous to that shown at 126 in FIG. 1) will be exactly the same, as when the same data is supplied to the pen motor and the pen carriage is moved at the same particular rate when a cut chart is used. In other words the rate of longitudinal movement of the pen relative to the recording chart will determine the abscissa base, regardless of whether it is the continuous strip chart that is being moved to the right at a particular rate, or whether (with a fixed cut chart) it is the pen carriage assembly that is being moved at this same particular rate to the left.

Of course, one advantage of continuous strip charts is that they may be moved relatively rapidly for relatively long periods of time without being exhausted (as compared to the necessarily relatively short fixed cut chart). Different size interchangeable pulleys (such as 84 and 140) may be employed instead of or preferably in addition to the variable speed transmission between motor 92 and the gears 90, 98, 100, 144, mentioned above. Unless a wide choice of motor 92 effective drive speeds are already provided (including the use of a wide-range variable speed transmission between motor 92 and the driven elements, i.e., shaft 94 and pinions 98 and 100), different size pulleys at 84 (which are easily changed, even by the user) may be provided with each instrument. Similarly, different sets of mating pinions and gears (i.e., sets in which the sum of the radius of the pinion plus that of the gear is constant) may be easily interchanged, at least by the seller (distributor or even retailer). This possible interchange-ability, coupled with any conventional variable speed control of the motor and/or any conventional variable speed transmission between the motor and the first driven elements (e.g., between motor 92 and shaft 94) yields an extremely versatile recorder of only moderate mechanical complexity (and therefore cost of both manufacture and maintenace).

Not only does the invention provide a recorder which may use either a moving continuous strip chart or a stationary precut chart, it may even be utilized as a true $x$–$y$ recorder (i.e., in which both the ordinate and abscissa values vary in a nonlinear manner by supplying a varying controlled signal to motor 92). The illustrated embodiment can be even adapted to moving both a perforated (continuous strip) chart and the entire pen carriage simultaneously in opposite directions (by clutching any of the elements of the disconnected drive train to the engaged one). This mode of operation may be of some advantage when extremely rapid abscissa movement is desired (the inertia of the carriage and the tendency of the continuous chart to wrinkle or jam being limiting factors in moving either one beyond a certain linear rate). It is even possible by simple additional gearing to move a continuous strip chart and the pen carriage in the same direction at slightly different speeds in order to get a very slow differential movement therebetween. Because of these additional functions and features to which the illustrated embodiment is adaptable, and the obvious substitutions of various equivalent elements (especially in the various belt and pulley (and other gear) drives of the exemplary, illustrated embodiment), the invention is not limited to or by the structural details of the exemplary disclosed embodiment. Rather, the invention is limited solely by the scope of the appended claims.

We claim:
1. A chart-type recorder capable of utilizing either a stationary chart or a moving strip chart comprising:
  means for receiving a recording chart;
  a pen carriage assembly including a pen mechanism movably mounted upon a pen carriage so as to be capable of movement transversely across a recording chart;
  means for positioning said pen mechanism transversely along said carriage at corresponding locations in accordance with a signal to be recorded;
  said pen carriage assembly being mounted for optional movement in a first longitudinal direction, adjacent said chart receiving means;
  optionally drivable moving means for causing movement of said carriage assembly in said first loongitudinal direction;
  optionally drivable feed means for feeding a recording chart of the continuous strip type in a second longitudinal direction, parallel to said first longitudinal direction;
  motive means;
  and drive connection means positionable into a first position operatively connecting said motive means to said optionally driverable carriage assembly moving means, and into a second position operatively connecting said motive means to said optionally drivable recording chart feed means;
  whereby said pen carriage assembly may be moved in said one longitudinal direction to cause the various transverse locations of said pen mechanism to be recorded on a stationary chart as a recorded curve, or alternatively said pen carriage assembly may remain stationary and a continuous strip chart may be fed in said second longitudinal direction to record said pen mechanism locations as a similar recorded curve.

2. A recorder according to claim 1, in which:
  said first longitudinal direction of optional pen carriage assembly movement and said second longitudinal direction of optional continuous strip recording chart movement are in opposite directions,
  whereby the relative longitudinal movement of said pen upon the recording chart is substantially the same in both modes of operation, regardless of whether the pen carriage assembly or the continuous strip recording chart is actually being moved.

References Cited

UNITED STATES PATENTS 2,527,207   10/1950   Barnes _____ 346—139

RICHARD B. WILKINSON, *Primary Examiner.*

EDITH C. SIMMONS, *Assistant Examiner.*